J. E. THORN.
Barrel-Rollers.
No. 147,028. Patented Feb. 3, 1874.
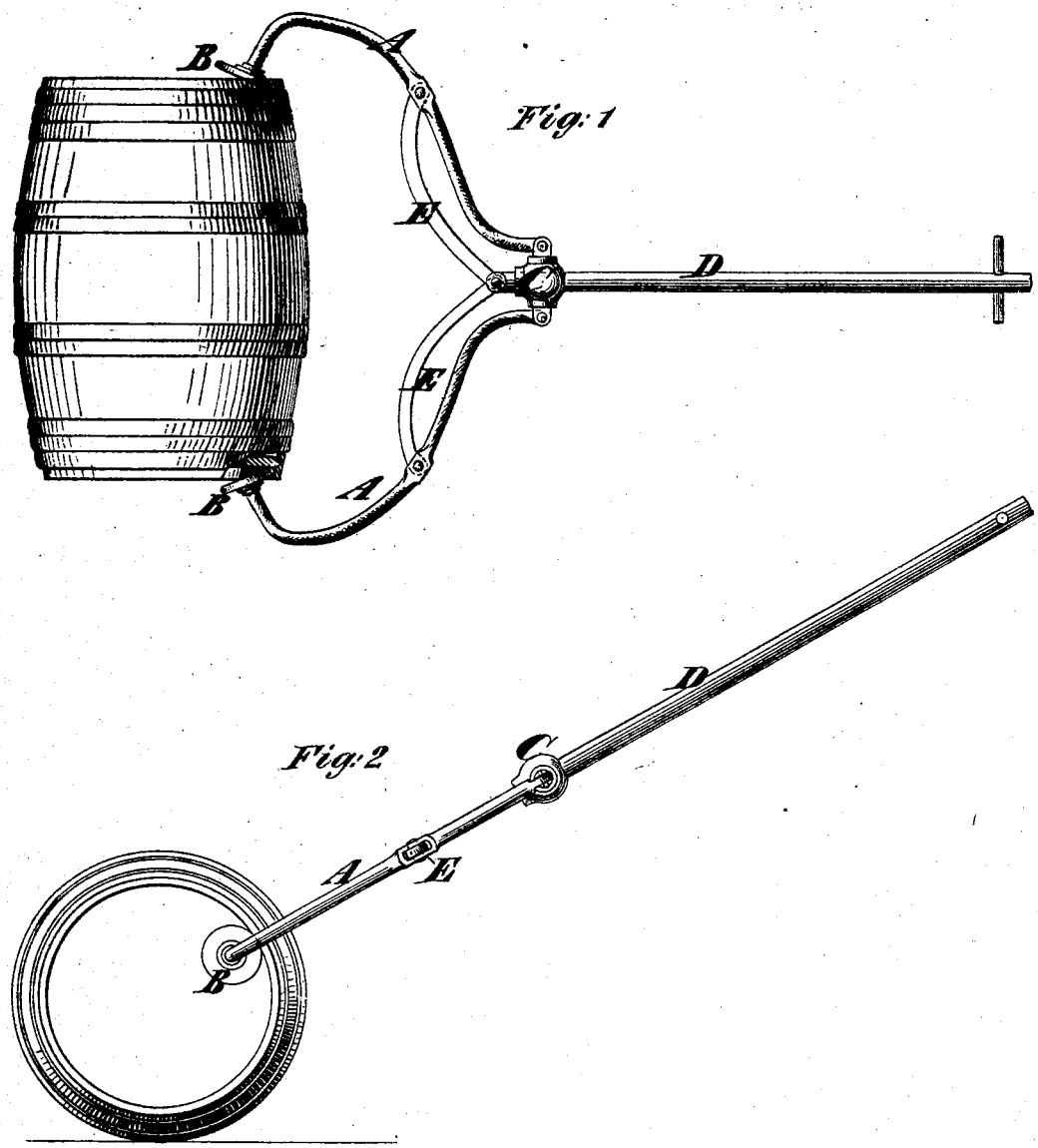

UNITED STATES PATENT OFFICE.

JOSEPH E. THORN, OF NEW YORK, N. Y.

IMPROVEMENT IN BARREL-ROLLERS.

Specification forming part of Letters Patent No. 147,028, dated February 3, 1874; application filed June 16, 1873.

*To all whom it may concern:*

Be it known that I, JOSEPH E. THORN, of the city, county, and State of New York, have invented an Implement for Rolling Barrels, of which the following is a specification:

This invention is designed to facilitate the rolling of barrels and casks from place to place. The rolling is effected by means of power applied, through the medium of rollers, to the chimes of the barrels to be moved. These rollers are arranged on the ends of levers, which are suitably shaped to embrace the ends of the barrel, and are fastened at the ends to a sliding collar situated on the handle of the implement. They are connected at the middle with the end of the handle by intermediate arms, so that the greater the power applied to the handle the more firmly will the rollers be held in place against the chimes, and slipping is thereby obviated.

In the accompanying drawing, Figure 1 is a top view of the implement applied to a barrel, and Fig. 2 is a side view of the same.

Similar letters of reference indicate corresponding parts in both figures.

A A are two levers, which are bent into such form that their outer ends may pass round the chimes of a barrel or cask to come into proximity to its head. These end portions, when the implement is applied to a barrel, occupy positions inclined to its axis, so that rollers B B, furnished on the ends, will be situated at inclines to the head, and on this account will have no tendency to slip off the chimes. These levers are fastened at their ends to a collar, C, arranged to slide longitudinally on the handle D of the implement. Arms E E, of a bent or bowed shape, are pivoted at one end to the middle portion of these levers, and at their other ends are both pivoted to the end of the handle D. The draft on the implement comes directly on these arms, and therefore there is imparted to the levers a tendency to press against the barrel-heads, so that their rollers are effectually prevented from slipping outward off the chimes.

The handle is represented as being straight, but beyond that part whereon the collar slides it may be of other form, if desirable.

In practice, I shall furnish the collar with a handle which may be griped by one hand while the handle or tongue is held in the other to open ends of the levers or tighten them on the ends of the barrel.

The implement as represented is only suitable for moving the barrel over the ground by drawing it; but it might be modified so that the barrel may be moved by pushing, by slightly altering its construction, namely, by extending the outer ends of the levers A A to enable them to reach the far side of the chimes, and by simply reversing the form of the operating arms E, so that a push would tend to draw the levers together, instead of forcing them apart.

By the use of this implement, barrels and casks may be rolled from place to place with great expedition, and with far less danger of injury than when rolled on the chimes, as they are ordinarily moved.

The handle may be dropped when desirable while transporting the barrel, and the implement will still remain in place so long as the barrel does not roll. Instead of a single handle two might be used, after the manner of ordinary ice-tongs.

What I claim as my invention is—

1. The combination of rollers and a handle or tongue, substantially as described, whereby the barrel is moved by power applied to its chimes through the medium of the rollers.

2. The combination of the levers A A, furnished at the ends with rollers, the collar C, handle D, and the arms E E, essentially as and for the purpose herein specified.

JOSEPH E. THORN.

Witnesses:
GEORGE G. COCHRAN,
MICHAEL RYAN.